United States Patent [19]

Mansukhani

[11] 4,170,482

[45] Oct. 9, 1979

[54] JET PRINTING INK COMPOSITION CONTAINING AN ACETYLENIC COMPOUND AND A LACTONE

[75] Inventor: Ishwar R. Mansukhani, Neenah, Wis.

[73] Assignee: M & T Chemicals Inc., Stamford, Conn.

[21] Appl. No.: 940,501

[22] Filed: Sep. 8, 1978

[51] Int. Cl.$^2$ .............................................. C09D 11/02
[52] U.S. Cl. ........................................ 106/20; 106/22; 106/32; 427/421
[58] Field of Search ............................. 106/22, 32, 20

[56] References Cited

U.S. PATENT DOCUMENTS

| | | | |
|---|---|---|---|
| T903,023 | 10/1972 | Hunter | 362/376 |
| 3,692,548 | 9/1972 | Packer | 106/22 |

*Primary Examiner*—Carman J. Seccuro
*Attorney, Agent, or Firm*—Kenneth G. Wheeless; Robert Spector

[57] ABSTRACT

An ink composition for use in jet printing comprising an aqueous solution of a water-soluble dye and a humectant consisting of the combination of at least one water-soluble acetylenic compound and the internal anhydride of at least one carboxylic acid in a ratio of 90:1 of the former to 1:90 of the latter.

25 Claims, No Drawings

JET PRINTING INK COMPOSITION CONTAINING AN ACETYLENIC COMPOUND AND A LACTONE

The invention relates jet ink and particularly an aqueous jet printing ink for printing with a jet ink printing system.

The principle underlying jet printing with ink is based on driving ink through a fine nozzle of metal or glass, so that uniform ink droplets are ejected from the nozzle tip. These ink droplets are electrostatically deflected with a deflecting electrode, arranged in front of the nozzle, so that symbols are printed with a preliminarily determined matrix. In this printing process the ink in the nozzle is divided in fine ink droplets and the direction of the ink jet is controlled by deflecting plates or through nozzle movement. This printing process is highly dependent on the properties of the ink. The ink must be capable of forming stable ink droplets under pressure and under an electrical field, which have a high deflection sensitivity. Further, the ink must readily emerge from the nozzle. In addition, clogging of the nozzle by drying ink must be prevented. Commercial nozzle jet inks are divided in aqueous and nonaqueous inks. Nonaqueous inks have the disadvantage of low stability ink droplets because of low surface tension. As a result, while in flight the ink droplets form a fog. In addition, such a nonaqueous ink has a high electrical resistance and a low deflecting sensitivity. At the same time, these ink droplets are particularly unstable under a high electrical charge. Consequently, it has been difficult to print clear and distinct symbols with this method.

The concepts of the present invention reside in a new and improved ink composition suitable for use in jet printing comprising an aqueous solution of a water-soluble dye and a humectant consisting of the combination of at least one acetylenic compound and the internal anhydride of at least one carboxylic acid in a ratio of 90:1 of the former to 1:90 of the latter.

Water-soluble acetylenic compounds employed in this invention are characterized by a highly nucleophilic triple bond which is free from steric hindrance and thus has a clear and unimpeded path in approaching the cathode.

The preferred water-soluble acetylenic compounds which may be employed in the process of this invention to produce nickel deposits may include α-substituted acetylenic compounds exhibiting the structural formula

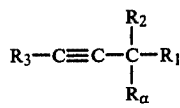

in which each of $R_1$ and $R_2$ may be substituents selected from the group consisting of hydrogen, alkyl, alkenyl, alkynyl, hydroxy-substituted and alkoxy-substituted alkyl, alkenyl, and alkynyl groups, and $R_1$ and $R_2$ may together be a carbonyl oxygen; $R_3$ may be a substituent of the group consisting of hydrogen, halogen, alkyl, alkenyl, alkynyl, hydroxy-substituted and alkoxy-substituted alkenyl and alkynyl groups, and substituted-alkyl groups having the formula:

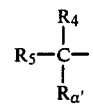

in which each of $R_4$ and $R_5$ may be substituents selected from the group consisting of hydrogen, alkyl, alkenyl, alkynyl, and hydroxy-substituted and alkoxy-substituted alkyl, alkenyl, and alkynyl groups, and when $R_1$ and $R_2$ together are carbonyl oxygen, $R_3$ may be an aryl group, including hydroxy and alkoxy and alkyl-substituted aryl; each of $R_\alpha$ and $R_{\alpha'}$ may be substituents selected from the group consisting of hydroxy, alkoxy, carboxy-substituted alkoxy, formoxy, alkanoxy, halogen and polyoxy groups. Where $R_3$ is a substituted-alkyl group having the above-illustrated formula, the acetylenic compound may be termed an α,α'-disubstituted acetylenic compound, since both carbon atoms vicinal to the same acetylenic bond contain either the same or a different functional group.

The compounds listed in Table I are illustrative of the water-soluble acetylenic compounds which may be used in practice of the process of this invention.

TABLE I 2-butyne-1,4-diol
1,4-di-(β-hydroxyethoxy)-2-butyne
1-(β-hydroxyethoxy)-2-butyne-4-ol
1,4-diacetoxy-2-butyne
3-butyne-1,2-diol
3-methyl-1-butyne-3-ol
3-methyl-1-pentyn-3-ol
2-propyn-1-ol
2,5-dimethyl-1-octen-3-yn-5-ol
3-methyl-1-nonyn-3-ol
2,4-hexadiyne-1,6-diol
1-methoxy-2-propyne
3-methoxy-3-methyl-4,6-heptadiyne
3-ethoxy-3,5,7-trimethyl-1-octyne
1-formoxy-2-propyne
1-acetoxy-2-propyne
3-methyl-1-nonyn-3-yl-acetate
phenyl-propiolamide
phenyl-propiol-N-phenylamide
phenyl-propiol-N,N'-dimethylamide
3-methyl-1-butyn-3-yl acetate
1-chloro-6-methoxy-2,4-hexadiyne
3-chloro-3-methyl-4-hexyne
1-bromo-2-propyne
1,2-di-(β-hydroxyethoxy)-3-butyne
3-(β-hydroxy-γ-chloropropoxy)-3-methyl-4-pentyne
3-(β-γ-epoxypropoxy)-3-methyl-4-pentyne Those acetylenic compounds which may be employed in the instant invention include those containing at least one hydroxy moiety, preferably compounds such as 2-butyne-1,4-diol.

The internal anhydride of at least one carboxylic acid include the lactones of fatty acids, the lactones of alicyclic acids, the lactones of acetylenic acids, and the lactones of aromatic acids.

It has been found that printing inks formulated in accordance with this invention have the desired viscosity for use in jet printing, and that the viscosity of the composition is subject to little variation with use as water is lost by evaporation during recirculation of the ink composition through the jet printer. In addition, the humectant of this invention substantially prevents or minimizes tip drying of the printing ink in the orifice or nozzle during down time of the printer, such as when the printer is shut down over night.

The total amount of the humectant mixture employed in the ink composition of the present invention can be varied within wide limits as dictated by the viscosity considerations of the ink composition.

As the coloring material in the ink composition of the invention, use should be made of a water-soluble dye or mixture of dyes. The use of pigments or other forms of particulate matter is preferably avoided since such materials tend to clog the very small orifice of the jet printer.

The nigrosine dye is not a single clearly identifiable compound but is identified in The Chemistry of Synthetic Dyes and Pigments at page 243 as being a mixture of the following structures:

Preferred dyes of the present invention are the commercially available direct dyes which generally contain an ionizable inorganic salt, such as Glauber salts, or sodium chloride which has been added during manufacture in order to standardize the dye lot. The inorganic material thus renders the dye conductive whereby the ink jet is capable of being deflected in an electromagnetic field during jet printing. Such direct dyes are well known to those skilled in the art and are commercially available, as represented by the C.I. direct black 38 dyes (e.g., capable of being deflected in an electromagnetic field Direct Black GW marketed by the Tenneco Color Division of Tenneco Chemicals and Capamine Black ESA marketed by the Capital Color and Chemical Co.). Such dyes are available in a number of colors, any one or more of which can be used in the practice of the invention. If use is made of a pure dye containing no ionizable salt, the desired conductivity can be achieved

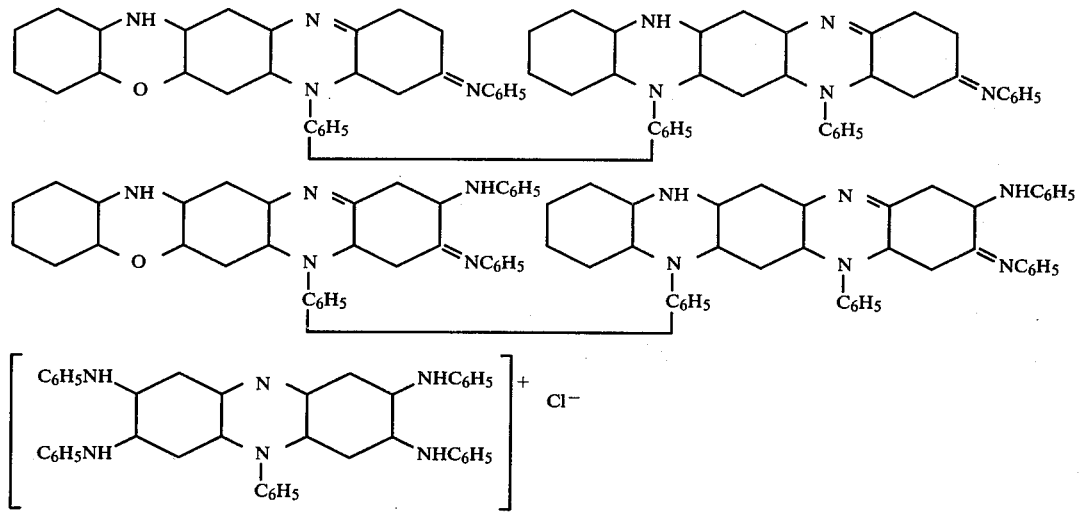

The compounds shown are the oil soluble derivatives. The nigrosines are rendered water soluble by the addition of sulfonic acid groups [—$SO_3H$] which form the sodium salt [—$SO_3Na$] in basic solutions. Induline 6B is believed to be a side product of the nigrosine fusion.

The Direct Black [CI 30245] dye is believed to have a chemical structure as shown below:

by adding 0.5% ionizable salt, such as one of the types described, to the composition. For a further description of such well known dyes, reference can be made to the Color Index, published by the Society of Dyes and Colorists in cooperation with the American Association of Textile Chemists and Colorists (1957).

The ink composition of the present invention can be prepared by thoroughly mixing the components to in-

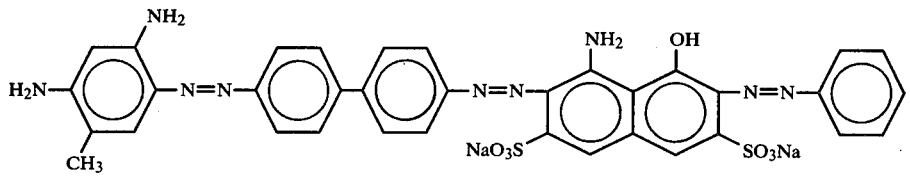

The Direct Black [CI 30235] dye is believed to have a chemical structure as shown below:

sure uniform mixing and complete dissolution of the water-soluble dye, and then filtering the resulting com-

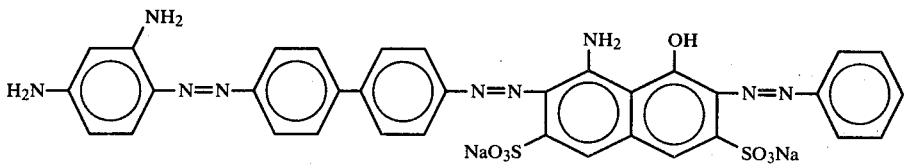

position to remove any particulate contamination. As will be apparent to those skilled in the art, filtration of the composition after mixing the components is highly desirable in order to remove from the ink composition particulate matter, such as contamination or undissolved dye, which might otherwise serve to clog or obstruct the jet of a jet printer during use. It is frequently preferred to filter the composition of the invention to remove particulate matter having a diameter greater than 2 microns, and preferably 1 micron, to insure that obstruction of the jet of the jet printer will be avoided.

The invention is described in the following on the basis of exemplified embodiments.

While there are disclosed below but a limited number of embodiments of the invention herein presented, it is possible to produce still other embodiments without departing from the inventive concepts herein disclosed. Various other modifications will be readily apparent to those skilled in the art.

The following novel composition is expressed in parts by weight:

EXAMPLE 1

| | |
|---|---|
| Direct Black C.I. 38 (Sold as Pontamine Black SP Liquid by E.I. DuPont deNemours & Co.) | 15% |
| Butyrolactone | 12% |
| 35% aqueous solution of 2-butyne-1,4-diol | 8% |
| Distilled water | 65% |
| | 100% |

Above inks give excellent print quality, ink dots on paper do not spread, and nozzle on ink jet printer remains open for long period of time.

By controlling the ratio of 2-butyne-1,4-diol and butyrolactone, it is possible to control the spread of ink dots on paper. Addition of other water miscible liquids also give a greater flexibility in controlling the spread of ink dots and ink drying on substrate.

What is claimed is:

1. In a process for information recording comprising producing a fine jet of colored aqueous liquid, directing the jet of colored liquid onto a recording medium, modulating the density of the applied jet by an electric field in accordance with the information to be recorded, the improvement comprising the presence as a humectant consisting of the combination of at least one water-soluble acetylenic compound selected from α-substituted acetylenic compounds exhibiting the structural formula:

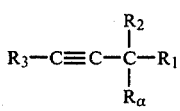

in which each of $R_1$ and $R_2$ may be substituents selected from the group consisting of hydrogen, alkyl, alkenyl, alkynyl, hydroxy-substituted and alkoxy-substituted alkyl, alkenyl, and alkynyl groups, and $R_1$ and $R_2$ may together be a carbonyl oxygen; $R_3$ may be a substituent of the group consisting of hydrogen, halogen, alkyl, alkenyl, alkynyl, hydroxy-substituted and alkoxy-substituted alkenyl and alkynyl groups, and substituted-alkyl groups having the formula:

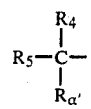

in which each of $R_4$ and $R_5$ may be substituents selected from the group consisting of hydrogen, alkyl, alkenyl, alkynyl, and hydroxy-substituted and alkoxy-substituted alkyl, alkenyl, and alkynyl groups, and when $R_1$ and $R_2$ together are carbonyl oxygen, $R_3$ may be an aryl group, including hydroxy and alkoxy and alkyl-substituted aryl; each of $R_\alpha$ and $R_{\alpha'}$ may be substituents selected from the group consisting of hydroxy, alkoxy, carboxy-substituted alkoxy, formoxy, alkanoxy, halogen and polyoxy groups and the internal anhydride of at least one carboxylic acid selected from the group consisting of the lactones of fatty acids, the lactones of alicyclic acids, the lactones of acetylenic acids, and the lactones of aromatic acids in a ratio of 90:1 of the former to 1:90 of the latter.

2. The process of claim 1 wherein said water-soluble acetylenic compound is 1,4-di-(β-hydroxyethoxy)-2-butyne.

3. The process of claim 1 wherein said water-soluble acethylenic compound is 1,4-di-(β-hydroxy-γ-chloropropoxy)-2-butyne.

4. The process of claim 1 wherein said water-soluble acetylenic compound is 1,4-di-(β-,γ-epoxypropoxy)-2-butyne.

5. The process of claim 1 wherein said water-soluble acetylenic compound is 1,4-di-(β-hydroxy-γ-butenoxy)-2-butyne.

6. The process of claim 1 wherein said water-soluble acetylenic compound is 1,4-di-(2'-hydroxy-4'-oxa-6'-heptenoxy)-2-butyne.

7. The process of claim 1 wherein said water-soluble acetylenic compound is 2-butyne-1,4-diol.

8. The process of claim 1 wherein said water-soluble acetylenic compound is propargyl alcohol.

9. The process of claim 1 wherein said water-soluble acetylenic compound is 2-methyl-3-butyn-2-ol.

10. The process of claim 1 wherein said water-soluble acetylenic compound is 1,4-di-(β-sulfoethoxy)-2-butyne.

11. The process of claim 1 wherein said water-soluble acetylenic compound is 3-(β-hydroxyethoxy)-propyne.

12. The process of claim 1 wherein said water-soluble acetylenic compound is 3-(β-hydroxypropoxy)-propyne.

13. The process of claim 1 wherein said internal anhydride is butyrolactone.

14. An ink composition for use in jet printing comprising an aqueous solution of a water-soluble dye and a humectant consisting of the combination of at least one water-soluble acetylenic compound selected from α-substituted acetylenic compounds exhibiting the structural formula:

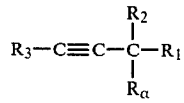

in which each of $R_1$ and $R_2$ may be substituents selected from the group consisting of hydrogen, alkyl, alkenyl, alkynyl, hydroxy-substituted and alkoxy-substituted alkyl, alkenyl, and alkynyl groups, and $R_1$ and $R_2$ may together be a carbonyl oxygen; $R_3$ may be a substituent of the group consisting of hydrogen, halogen, alkyl, alkenyl, alkynyl, hydroxy-substituted and alkoxy-substituted alkenyl and alkynyl groups, and substituted-alkyl groups having the formula:

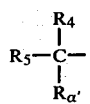

in which each of $R_4$ and $R_5$ may be substituents selected from the group consisting of hydrogen, alkyl, alkenyl, alkynyl, and hydroxy-substituted and alkoxy-substituted alkyl, alkenyl, and alkynyl groups, and when $R_1$ and $R_2$ together are carbonyl oxygen, $R_3$ may be an aryl group, including hydroxy and alkoxy and alkyl-substituted aryl; each of $R_\alpha$ and $R_{\alpha'}$ may be substituents selected from the group consisting of hydroxy, alkoxy, carboxy-substituted alkoxy, formoxy, alkanoxy, halogen and polyoxy groups and the internal anhydride of at least one carboxylic acid selected from the group consisting of the lactones of fatty acids, the lactones of alicyclic acids, the lactones of acetylenic acids, and the lactones of aromatic acids in a ratio of 90:1 of the former to 1:90 of the latter.

15. The composition of claim 14 wherein said water-soluble acetylenic compound is 1,4-di-($\beta$-hydroxyethoxy)-2-butyne.

16. The composition of claim 14 wherein said water-soluble acetylenic compound is 1,4-di-($\beta$-hydroxy-$\gamma$-chloropropoxy)-2-butyne.

17. The composition of claim 14 wherein said water-soluble acetylenic compound is 1,4-di-($\beta$-,$\gamma$-epoxypropoxy)-2-butyne.

18. The composition of claim 14 wherein said water-soluble acetylenic compound is 1,4-di-($\beta$-hydroxy-$\gamma$-butenoxy)-2-butyne.

19. The composition of claim 14 wherein said water-soluble acetylenic compound is 1,4-di-(2'-hydroxy-4'-oxa-6'-heptenoxy)-2-butyne.

20. The composition of claim 14 wherein said water-soluble acetylenic compound is 2-butyne-1,4-diol.

21. The composition of claim 14 wherein said water-soluble acetylenic compound is propargyl alcohol.

22. The composition of claim 14 wherein said water-soluble acetylenic compound is 2-methyl-3-butyn-2-ol.

23. The composition of claim 14 wherein said water-soluble acetylenic compound is 1,4-di-($\beta$-sulfoethoxy)-2-butyne.

24. The composition of claim 14 wherein said water-soluble acetylenic compound is 3-($\beta$-hydroxyethoxy)-propyne.

25. The composition of claim 14 wherein said water-soluble acetylenic compound is 3-($\beta$-hydroxypropoxy)-propyne.

* * * * *